United States Patent
Jung et al.

(10) Patent No.: US 12,070,081 B2
(45) Date of Patent: Aug. 27, 2024

(54) AEROSOL GENERATING DEVICE, AND METHOD AND APPARATUS FOR TRANSMITTING AND RECEIVING DATA

(71) Applicant: KT&G CORPORATION, Daejeon (KR)

(72) Inventors: Sun Hwan Jung, Daejeon (KR); Dong Kyun Ko, Sejong (KR); Ji Hun Yang, Sejong (KR); In Su Park, Seoul (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 773 days.

(21) Appl. No.: 17/251,538

(22) PCT Filed: Jul. 2, 2019

(86) PCT No.: PCT/KR2019/008019
§ 371 (c)(1),
(2) Date: Dec. 11, 2020

(87) PCT Pub. No.: WO2020/009411
PCT Pub. Date: Jan. 9, 2020

(65) Prior Publication Data
US 2021/0251300 A1    Aug. 19, 2021

(30) Foreign Application Priority Data

Jul. 4, 2018    (KR) .......................... 10-2018-0077888

(51) Int. Cl.
*A24F 40/65*    (2020.01)
*A24F 40/53*    (2020.01)
(Continued)

(52) U.S. Cl.
CPC .............. *A24F 40/65* (2020.01); *A24F 40/53* (2020.01); *A24F 40/60* (2020.01); *H04W 12/06* (2013.01); *H04W 76/14* (2018.02); *H04W 4/80* (2018.02)

(58) Field of Classification Search
CPC ....... H04W 76/14; H04W 12/06; H04W 4/80; A24F 40/65; A24F 40/53; A24F 40/60
See application file for complete search history.

(56) References Cited

U.S. PATENT DOCUMENTS 10,973,258 B2    4/2021  Alarcon et al.
2013/0340775 A1*  12/2013  Juster ................. H04L 12/1827
                                                        131/273
(Continued)

FOREIGN PATENT DOCUMENTS

| CN | 101295423 A | 10/2008 |
| CN | 105848503 A | 8/2016 |

(Continued)

OTHER PUBLICATIONS

Communication dated Nov. 9, 2021 from the Korean Patent Office in Korean Application No. 10- 2021-0148124.
(Continued)

*Primary Examiner* — Darshan I Dhruv
(74) *Attorney, Agent, or Firm* — Sughrue Mion, PLLC

(57) ABSTRACT

A mobile terminal includes a communication unit configured to form a communication link with an aerosol generating device, and a controller configured to receive data from the aerosol generating device through the communication link and, by using the received data, perform an operation related to the aerosol generating device or output information about the aerosol generating device.

7 Claims, 10 Drawing Sheets

(51) Int. Cl.
*A24F 40/60* (2020.01)
*H04W 12/06* (2021.01)
*H04W 76/14* (2018.01)
*H04W 4/80* (2018.01)

(56) References Cited

U.S. PATENT DOCUMENTS

| | | | |
|---|---|---|---|
| 2015/0142387 A1* | 5/2015 | Alarcon | A61M 15/0083 |
| | | | 702/187 |
| 2015/0181945 A1* | 7/2015 | Tremblay | A24F 40/60 |
| | | | 131/328 |
| 2015/0208723 A1* | 7/2015 | Glazer | F23Q 7/14 |
| | | | 434/238 |
| 2015/0304401 A1* | 10/2015 | Liu | A24F 40/65 |
| | | | 709/217 |
| 2016/0029697 A1 | 2/2016 | Shafer | |
| 2016/0278435 A1* | 9/2016 | Choukroun | A24F 40/50 |
| 2016/0321879 A1 | 11/2016 | Oh et al. | |
| 2016/0371437 A1* | 12/2016 | Alarcon | G01D 9/00 |
| 2017/0092106 A1* | 3/2017 | Cameron | A24F 40/65 |
| 2017/0140125 A1* | 5/2017 | Hogg | G08B 25/08 |
| 2017/0180390 A1* | 6/2017 | Plouchart | H04L 67/1031 |
| 2018/0020720 A1* | 1/2018 | Matischek | H04B 5/24 |
| | | | 131/329 |
| 2021/0037892 A1* | 2/2021 | Fard | A24F 40/65 |
| 2021/0037893 A1* | 2/2021 | Fard | H04M 1/72412 |

FOREIGN PATENT DOCUMENTS

| | | | |
|---|---|---|---|
| CN | 106102811 A | 11/2016 | |
| KR | 10-1267537 B1 | 5/2013 | |
| KR | 10-1570106 B1 | 11/2015 | |
| KR | 10-2016-0009678 A | 1/2016 | |
| KR | 10-2016-0012329 A | 2/2016 | |
| KR | 10-2016-0040444 A | 4/2016 | |
| KR | 10-2017-0067171 A | 6/2017 | |
| KR | 10-2017-0108498 A | 9/2017 | |
| WO | 2014/195805 A2 | 12/2014 | |
| WO | WO-2014195805 A2 * | 12/2014 | A24F 13/02 |

OTHER PUBLICATIONS

Extended European Search Report dated Nov. 12, 2021 in European Application No. 19831491.6.
International Search Report for PCT/KR2019/008019 dated Oct. 10, 2019 [PCT/ISA/210].
Office Action dated Apr. 15, 2023 from the Chinese Patent Office in Application No. 201980045423.6.
Office Action issued Sep. 21, 2023 in Chinese Application No. 201980045423.6.

* cited by examiner

AEROSOL GENERATING DEVICE, AND METHOD AND APPARATUS FOR TRANSMITTING AND RECEIVING DATA

CROSS REFERENCE TO RELATED APPLICATIONS

This application is a National Stage of International Application No. PCT/KR2019/008019 filed Jul. 2, 2019, claiming priority based on Korean Patent Application No. 10-2018-0077888 filed Jul. 4, 2018.

TECHNICAL FIELD

One or more embodiments of the present disclosure relate to a device and method for transmitting and receiving data to and from an aerosol generating device.

BACKGROUND ART

Recently, the demand for alternative methods to overcome the shortcomings of general cigarettes has increased. For example, there is an increasing demand for a method of generating aerosol by heating an aerosol generating material in cigarettes, rather than by burning cigarettes. Accordingly, studies on a heating-type cigarette or a heating-type aerosol generating device have been actively conducted.

Since the size of an aerosol generating device is similar to that of a conventional cigarette, the sizes of a processor and a memory included in the aerosol generating device are limited. Accordingly, there have been limitations in terms of functions that an aerosol generating device may provide to a user. In order to overcome such limitations, a technology has been proposed which provides the user with additional functionality by using a personal computer (PC) that forms a communication link with the aerosol generating device.

However, since the user is unable to carry the PC with himself or herself all the time, there is a restriction in terms of place in providing the user with additional functionality using the PC. Therefore, there is need for a technology that provides the user with additional functionality without any restrictions in terms of place.

DESCRIPTION OF EMBODIMENTS

Solution to Problem

One or more embodiments of the present disclosure provide a device and method for transmitting and receiving data to and from an aerosol generating device. For example, a mobile terminal that transmits and receives data to and from the aerosol generating device includes a communication unit configured to form a communication link with the aerosol generating device, and a controller configured to receive data from the aerosol generating device through the communication link and perform an operation associated with the aerosol generating device or output information about the aerosol generating device, by using the received data. Additional aspects will be set forth in part in the description which follows and, in part, will be apparent from the description, or may be learned by the practice of the presented embodiments.

Advantageous Effects of Disclosure

One or more embodiments of the present disclosure provide a device and method for transmitting and receiving data to and from an aerosol generating device. More specifically, a mobile terminal according to one or more embodiments of the present disclosure forms a communication link with the aerosol generating device, receives data from the aerosol generating device through the communication link, and performs an operation associated with the aerosol generating device or outputs information about the aerosol generating device, by using the received data. Since a user usually carries a mobile terminal with himself or herself, additional functionality may be provided to the user without any restrictions in terms of place due to the mobile terminal.

In addition, the user may be provided with various functions such as a function of preventing loss of the aerosol generating device, a function of providing smoking statistics information including places in which the user has smoked, and the like, based on the specificity of the mobile terminal.

BEST MODE

Figure 1:
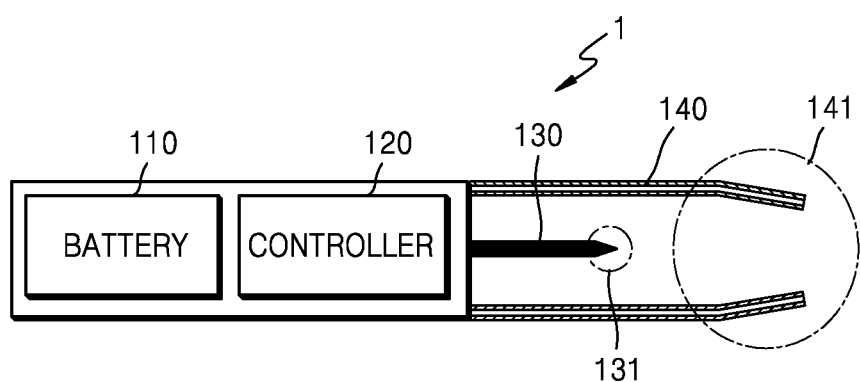
FIG. 1 is a configuration diagram illustrating an example of an aerosol generating device.

According to an aspect of the present disclosure, a mobile terminal that transmits and receives data to and from an aerosol generating device includes a communication unit configured to form a communication link with the aerosol generating device; and a controller configured to receive data from the aerosol generating device through the communication link, and perform an operation associated with the aerosol generating device or output information about the aerosol generating device, by using the received data.

The controller may obtain a unique ID (identification) of the aerosol generating device from the aerosol generating device through the communication link, determine whether or not the obtained unique ID of the aerosol generating device and user authentication information correspond to each other, and transmit the determined result to the aerosol generating device.

The mobile terminal may further include a user input unit, and the user authentication information may include at least one of a user ID, a password, and biometric identification information input by the user input unit.

The controller may obtain information on a puff of the user from the aerosol generating device and generate smoking statistics information of the user, based on the obtained information on the puff of the user.

The information on the puff of the user may include information on at least one of whether or not puffing has started, whether or not puffing has ended, the number of puffs, and a period of time during which puffing has lasted.

In addition, the smoking statistics information may include information on at least one of an average number of puffs, an average period of time during which puffing lasts, places in which the user has smoked, the number of cigarettes consumed during a specific period of time, and a type of cigarette consumed.

The controller may detect whether or not the mobile terminal is separated by a preset distance or more from the aerosol generating device and output an alarm based on the detected result.

According to an example, as the mobile terminal is spaced apart from the aerosol generating device and accordingly, the communication link is disconnected, the controller may determine that the mobile terminal is separated by the preset distance or more from the aerosol generating device.

The controller may obtain information about a battery from the aerosol generating device and display at least one of an available time of the aerosol generating device and a remaining capacity of the battery on a screen, based on the obtained information about the battery.

The communication link may be formed by a short-range communication method including at least one of wireless fidelity (Wi-Fi), Bluetooth, Zigbee, Wi-Fi Direct (WFD), ultra wideband (UWB), Bluetooth Low Energy (BLE), and near-field communication (NFC).

According to another aspect of the present disclosure, a method, performed by a mobile terminal, of transmitting and receiving data to and from an aerosol generating device, the method includes: forming a communication link with the aerosol generating device; receiving data from the aerosol generating device through the communication link; and performing an operation associated with the aerosol generating device or outputting information about the aerosol generating device, by using the received data.

According to another aspect of the present disclosure, a computer-readable recording medium has recorded thereon one or more programs including instructions for executing the method described above.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described in detail with reference to the accompanying drawings, in which exemplary embodiments of the present disclosure are shown such that one of ordinary skill in the art may easily work the present disclosure. The present disclosure may, however, be embodied in many different forms and should not be construed as being limited to the embodiments set forth herein.

Hereinafter, embodiments of the present disclosure will be described in detail with reference to the accompanying drawings.

FIG. 1 is a configuration diagram illustrating an example of an aerosol generating device.

Referring to FIG. 1, an aerosol generating device 1 (hereinafter, referred to as a 'holder') may include a battery 110, a controller 120, and a heater 130. The holder 1 also includes an inner space formed by a case 140. A cigarette may be inserted into the inner space of the holder 1.

Only components related to the present embodiment are illustrated in the holder 1 illustrated in FIG. 1. Thus, those skilled in the art related to the present embodiment may understand that other general-purpose components may be further included in the holder 1 in addition to the components illustrated in FIG. 1.

When the cigarette is inserted into the holder 1, the holder 1 heats the heater 130. Temperature of an aerosol generating material in the cigarette is raised by the heated heater 130, and an aerosol is generated, accordingly. The generated aerosol is delivered to a user through a filter of the cigarette. Still, even when the cigarette is not inserted into the holder 1, the holder 1 may heat the heater 130, for example, to clean the heater 130.

The case 140 may be moved between a first position and a second position. For example, when the case 140 is located at the first position, the user may insert the cigarette into the holder 1 to inhale the aerosol. On the other hand, when the case 140 is located at the second position, the user may remove or separate the cigarette from the holder 1. As the user pushes or pulls the case 140, the case 140 may be moved between the first position and the second position. In addition, the case 140 may be completely separated from the holder 1 by the user's operation.

A diameter of a hole formed by an end 141 of the case 140 may be made smaller than a diameter of a space formed by the case 140 and the heater 130, in which case the hole may serve as a guide for the cigarette inserted into the holder 1.

The battery 110 supplies electric power used for the holder 1 to operate. For example, the battery 110 may supply electric power for the heater 130 to be heated, and may supply electric power required for the controller 120 to operate. The batter 110 may also supply electric power required for a display, a sensor, a motor, and the like installed in the holder 1 to operate.

The battery 110 may include a lithium iron phosphate (LiFePO4) battery. However, embodiments of the present disclosure are not limited thereto. The battery 110 may also include a lithium cobalt oxide (LiCoO2) battery, a lithium titanate battery, or the like.

Whether the battery 110 is fully charged or completely discharged may be determined by a degree of electric power stored in the battery 110 relative to a total capacity of the battery 110. For example, when the electric power stored in the battery 110 corresponds to 95% or more of the total capacity of the battery 110, it may be determined that the battery 110 is fully charged. On the other hand, when the electric power stored in the battery 110 corresponds to 10% or less of the total capacity of the battery 110, it may be determined that the battery 110 is completely discharged. However, criteria for determining whether the battery 110 is fully charged or completely discharged are not limited to the above-described example.

The heater 130 is heated by electric power supplied by the battery 110. When the cigarette is inserted into the holder 1, the heater 130 is located inside the cigarette. Therefore, the heated heater 130 may raise the temperature of the aerosol generating material in the cigarette.

The heater 130 may be manufactured in a shape that may be easily inserted into the cigarette. For example, the heater 130 may be in a blade shape or a combination of a cylinder and a cone. However, embodiments of the present disclosure are not limited thereto. Only a portion of the heater 130 may be heated. For example, only a first portion of the hater 130 may be heated, and a second portion of the heater 130 may not be heated. Here, the first portion may include a portion at which a tobacco rod is located when the cigarette is inserted into the holder 1. Alternatively, each portion of the heater 130 may be heated to a different temperature. For example, the above-described first and second portions may be heated to different temperatures from each other.

The heater 130 may include an electric resistive heater. For example, the heater 130 may be manufactured such that an electrically conductive track is disposed on a substrate formed of an electrically insulating material. Here, the substrate may be made of a ceramic material, and a electrically conductive track may be made of tungsten. However, embodiments of the present disclosure are not limited thereto.

A separate temperature detection sensor may be provided in the holder 1. Alternatively, a temperature detection sensor may not be provided in the holder 1, and the heater 130 may serve as a temperature detection sensor, instead. Alternatively, while the heater 130 of the holder 1 serves as a temperature detection sensor, the holder 1 may be further provided with a separate temperature detection sensor. In order for the heater 130 to serve as a temperature detection sensor, the heater 130 may include at least one electrically conductive track for heat generation and temperature detection. In addition, the heater 130 may separately include a second electrically conductive track for the temperature detection in addition to a first electrically conductive track for the heat generation.

For example, when a voltage across the electrically conductive track and a current flowing through the electrically conductive track are measured, resistance R may be determined. In that case, temperature T of the electrically conductive track may be determined by Equation 1 below.

$$R=R_0\{1+\alpha(T-T_0)\}$$ [Equation 1]

In Equation 1, R refers to a current resistance value of the electrically conductive track, $R_0$ refers to a resistance value at temperature $T_0$ (for example, 0° C.), and a refers to a resistance temperature coefficient of the electrically conductive track. Since a conductive material (for example, a metal) has an intrinsic resistance temperature coefficient, a may be predetermined according to the conductive material constituting the electrically conductive track. Therefore, when the resistance R of the electrically conductive track is determined, the temperature T of the electrically conductive track may be calculated by Equation 1 above.

The electrically conductive track includes an electrically resistive material. As an example, the electrically conductive track may be made of a metallic material. As another example, the electrically conductive track may be made of an electrically conductive ceramic material, carbon, a metal alloy, or a composite material of a ceramic material and a metal.

The holder 1 may also include both the electrically conductive track that serves as a temperature detection sensor and the temperature detection sensor.

The controller 120 controls the overall operation of the holder 1. More specifically, the controller 120 controls not only the battery 110 and the heater 130 but also operation of other components of the holder 1. In addition, the controller 120 may check state of each of the components of the holder 1 to determine whether or not the holder 1 is operable.

The controller 120 includes at least one processor. The processor may be implemented as an array of a plurality of logic gates or may be implemented as a combination of a general-purpose microprocessor and a memory in which a program executable in the microprocessor is stored. In addition, those skilled in the art to which the present embodiment pertains may understand that the processor may also be implemented with other types of hardware.

For example, the controller 120 may control operation of the heater 130. The controller 120 may control an amount of electric power supplied to the heater 130 and a period of time during which electric power is supplied to the heater 130 such that the heater 130 is heated to a certain temperature or maintains an appropriate temperature. In addition, the controller 120 may check a state of the battery 110 (e.g., a remaining capacity of the battery 110, etc.), and generate a notification signal, if necessary.

The controller 120 may also check presence or absence of a puff of the user and intensity of the puff, and may count the number of puffs. In addition, the controller 120 may continue checking the time when the holder 1 is in operation. The controller 120 may also check whether or not a cradle 2 to be described later is coupled to the holder 1, and may control operation of the holder 1 according to coupling or separation of the cradle 2 and the holder 1.

The holder 1 may further include general-purpose components in addition to the battery 110, the controller 120, and the heater 130.

For example, the holder 1 may include a display capable of outputting visual information or a motor for outputting tactile information. As an example, when the holder 1 includes the display, the controller 120 may transmit, to the user through the display, information on a state of the holder 1 (for example, availability of the holder 1, etc.), information on the heater 13 (for example, start of preheating, progress of preheating, completion of preheating, etc.), information related to the battery 110 (for example, a remaining capacity of the battery 110, availability of the battery 110, etc.), information related to resetting of the holder 1 (for example, a time for resetting, progress of resetting, completion of resetting, etc.), information related to cleaning of the holder 1 (for example, a time for cleaning, need of cleaning, progress of cleaning, completion of cleaning, etc.), information related to charging of the holder 1 (for example, need of charging, progress of charging, completion of charging, etc.), information related to a puff (for example, the number of puffs, notice of puff termination, etc.), information related to safety (for example, elapse of use time, etc.), or the like. As another example, when the holder 1 includes the motor, the controller 120 may transmit the above-described information to the user by generating a vibration signal using the motor.

The holder 1 may also include at least one input device (e.g., a button) that allow the user to control a function of the holder 1 and/or a terminal coupled to the cradle 2. For example, the user may use the input device of the holder 1 to execute various functions. The user may execute a desired function among a plurality of functions of the holder 1 by regulating the number of times (e.g., once, twice, etc.) the input device is pressed or a period of time (e.g., 0.1 seconds, 0.2 seconds, etc.) during which the input device is pressed. As the user operates the input device, the holder 1 may execute a function of preheating the heater 130, a function of regulating a temperature of the heater 130, a function of cleaning a space into which the cigarette is inserted, a function of checking whether the holder 1 is in an operable state, a function of displaying the remaining capacity (available power) of the battery 110, a function of resetting the holder 1, and the like. However, functions of the holder 1 are not limited thereto.

For example, the holder 1 may control the heater 130 to clean the space into which the cigarette is inserted, as follows. For example, the holder 1 may heat the heater 130 to an adequately high temperature to clean the space into which the cigarette is inserted. Here, an adequately high temperature refers to a temperature suitable for cleaning the space into which the cigarette is inserted. For example, the holder 1 may heat the heater 130 to a highest temperature of a temperature range within which the aerosol may be generated from the inserted cigarette and a temperature range within which the heater 130 is preheated. However, embodiments of the present disclosure are not limited thereto.

In addition, the holder 1 may maintain the temperature of the heater 130 at an adequately high temperature for a certain period of time. Here, a certain period of time refers to an adequate period of time during which the space into which the cigarette is inserted is cleaned. For example, the holder 1 may maintain the temperature of the heated heater 130 for an appropriate period of time of 10 seconds to 10 minutes. However, embodiments of the present disclosure are not limited thereto. It is desirable that the holder 1 maintain the temperature of the heated heater 130 for an appropriate period of time selected from within a range of 20 seconds to 1 minute. It is also desirable that the holder 1 maintain the temperature of the heated heater 130 for an appropriate period of time selected from within a range of 20 seconds to 1 minute 30 seconds.

As the holder 1 heats the heater 130 to an adequately high temperature and also maintains the temperature of the heated heater 130 for a certain period of time, a material deposited on a surface of the heater 130 and/or in the space into which the cigarette is inserted is volatilized. Thus, an effect of cleaning may be caused.

The holder 1 may further include a puff detection sensor, a temperature detection sensor, and/or a cigarette insertion detection sensor. For example, the puff detection sensor may be implemented by a common pressure sensor. Alternatively, the holder 1 may detect the puff through a change in the resistance of the electrically conductive track included in the heater 130 without including a separate puff detection sensor. Here, the electrically conductive track includes an electrically conductive track for heat generation and/or an electrically conductive track for temperature detection. Alternatively, the holder 1 may further include a puff detection sensor separately from detecting the puff using the electrically conductive track included in the heater 130.

The cigarette insertion detection sensor may be implemented by a common capacitive sensor or a resistance sensor. In addition, the holder 1 may be manufactured in a structure that allows air from the outside to flow in/out while the cigarette is inserted.

Figure 2:
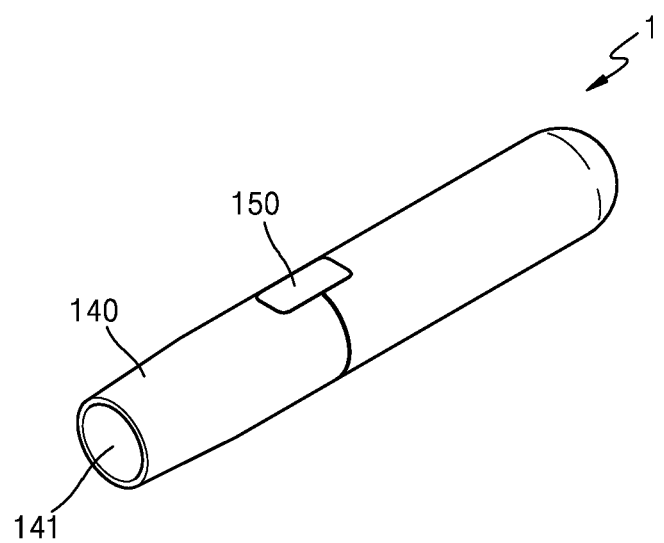
FIG. 2 is a diagram illustrating an example of a holder.

FIG. 2 is a diagram illustrating an example of a holder.

As illustrated in FIG. 2, the holder 1 may be manufactured in a cylindrical shape. However, embodiments of the present disclosure are not limited thereto. The case 140 of the holder 1 may be moved or separated by a user's operation, and a cigarette may be inserted into the end 141 of the case 140. In addition, the holder 1 may include a button 150 that allows the user to control the holder 1. The holder 1 may further include a display on which an image is output, if necessary.

Figure 3:
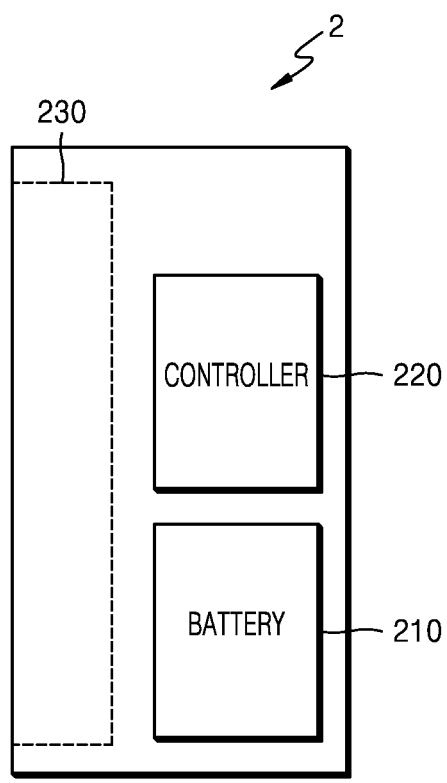
FIG. 3 is a configuration diagram illustrating an example of a cradle.

FIG. 3 is a configuration diagram illustrating an example of a cradle.

Referring to FIG. 3, the cradle 2 includes a battery 210 and a controller 220. The cradle 2 also includes an inner space 230 into which the holder 1 may be inserted. Depending on a design of the cradle 2, the cradle 2 may or may not include a separate lid. As an example, even if a separate lid is not included in the cradle 2, the holder 1 may be inserted into the cradle 2 and fixed thereto. As another example, as the holder 1 is inserted into the cradle 2 and then a lid of the cradle 2 is closed, the holder 1 may be fixed to the cradle 2.

The cradle 2 illustrated in FIG. 3 illustrates only components related to the present embodiment. Therefore, those skilled in the art related to the present embodiment may understand that other general-purpose components in addition to the components illustrated in FIG. 3 may be further included in the cradle 2.

The battery 210 supplies electric power used for the cradle 2 to operate. The battery 210 may also supply electric power to charge the battery 110 of the holder 1. For example, when the holder 1 is inserted into the cradle 2 so that a terminal of the holder 1 and a terminal of the cradle 2 are coupled to each other, the battery 210 of the cradle 2 may supply electric power to the battery 110 of the holder 1.

When the holder 1 and the cradle 2 are coupled to each other, the battery 210 may also supply electric power used for the holder 1 to operate. For example, when the terminal of the holder 1 and the terminal of the cradle 2 are coupled to each other, regardless of whether or not the battery 110 of the holder 1 is discharged, the holder 1 may use the electric power supplied by the battery 210 of the cradle 2 to operate.

For example, the battery 210 may include a lithium ion battery. However, embodiments of the present disclosure are not limited thereto. In addition, a capacity of the battery 210 may be greater than a capacity of the battery 110.

The controller 220 controls the overall operation of the cradle 2. The controller 220 may control operation of all components of the cradle 2. In addition, the controller 220 may determine whether the holder 1 and the cradle 2 are coupled to each other, and control operation of the cradle 2 according to coupling or separation of the cradle 2 and the holder 1.

For example, when the holder 1 and the cradle 2 are coupled to each other, the controller 220 may supply the electric power of the battery 210 to the holder 1 to charge the battery 110 or heat the heater 130. Therefore, even when a remaining capacity of the battery 110 is small, a user may couple the holder 1 to the cradle 2 to continue smoking.

The controller 220 includes at least one processor. The processor may be implemented as an array of a plurality of logic gates or may be implemented as a combination of a general-purpose microprocessor and a memory in which a program executable in the microprocessor is stored. In addition, those skilled in the art to which the present embodiment pertains may understand that the processor may be implemented with other types of hardware.

The cradle 2 may further include general-purpose components in addition to the battery 210 and the controller 220. For example, the cradle 2 may include a display capable of outputting visual information. For example, when the cradle 2 includes the display, the controller 220 may generate a signal to be displayed on the display to provide the user with information related to the battery 210 (e.g., a remaining capacity, availability, and the like of the battery 210), information related to resetting of the cradle 2 (e.g., a time for resetting, progress of resetting, completion of resetting, and the like), information related to cleaning of the holder 1 (e.g., a time for cleaning, need of cleaning, progress of cleaning, completion of cleaning, and the like), information related to charging of the cradle 2 (e.g., need of charging, progress of charging, completion of charging, and the like), and the like.

The cradle 2 may further include at least an input device (for example, a button) that allow the user to control a function of the cradle 2, a terminal coupled to the holder 1 and/or an interface (for example, a universal serial bus (USB) port, and the like) to charge the battery 210.

For example, the user may use the input device of the cradle 2 to execute various functions. The user may regulate the number of times the input device is pressed or a period of time during which the input device is pressed to execute a desired function among a plurality of functions of the cradle 2. As the user operates the input device, the cradle 2 may execute a function of preheating the heater 130 of the holder 1, a function of regulating the temperature of the heater 130 of the holder 1, a function of cleaning the space in the holder 1 into which a cigarette is inserted, a function of checking whether the cradle 2 is in an operable state, a function of displaying the remaining capacity (available power) of the battery 210 of the cradle 2, a function of resetting the cradle 2, and the like. However, functions of the cradle 2 are not limited thereto.

Figure 4A:
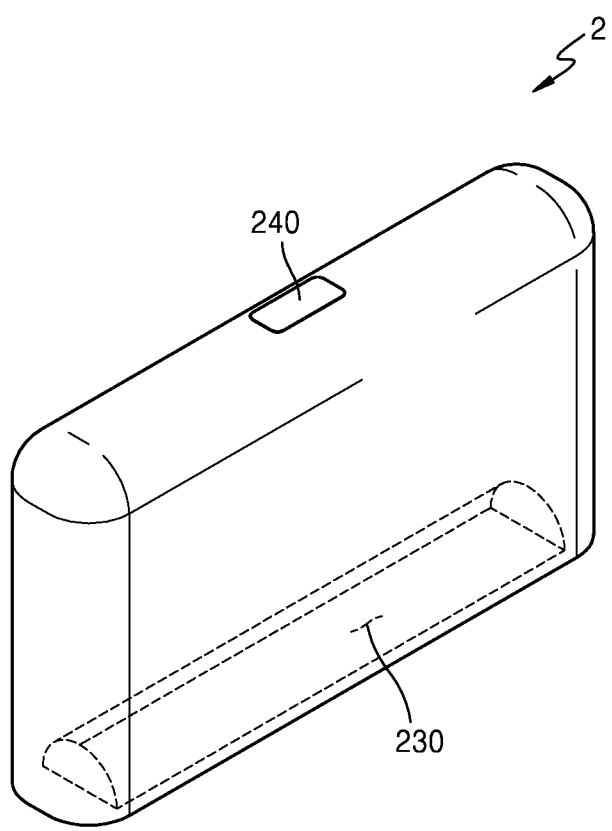
FIGS. 4A and 4B are diagrams illustrating examples of a cradle.
Figure 4B:
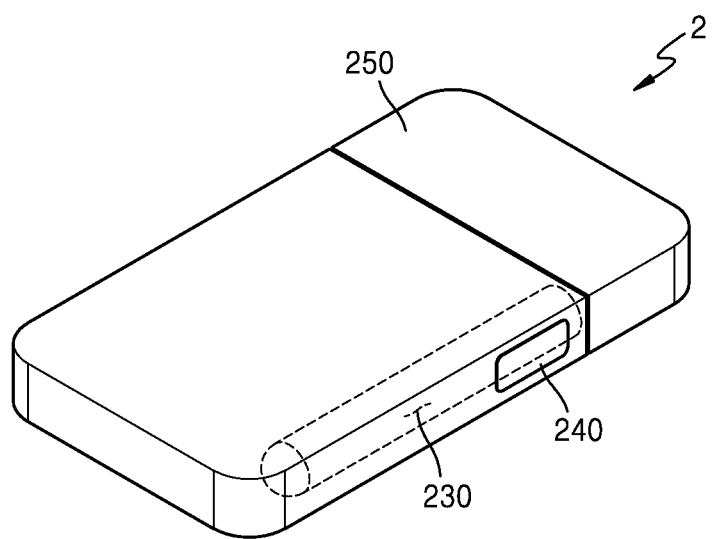

FIGS. 4A and 4B are diagrams illustrating examples of a cradle.

FIG. 4A illustrates an example of the cradle 2 that does not include a lid. For example, the space 230 into which the holder 1 may be inserted may be present on one side of the cradle 2. Even if the cradle 2 does not include a separate fixing means such as a lid, the holder 1 may be inserted into the cradle 2 and fixed thereto. In addition, the cradle 2 may include a button 240 that allows a user to control the cradle 2. The cradle 2 may further include a display on which an image is output, if necessary.

FIG. 4B illustrates an example of the cradle 2 that includes a lid. For example, as the holder 1 is inserted into the inner space 230 of the cradle 2 and then a lid 250 is closed, the holder 1 may be fixed to the cradle 2.

Figure 5:
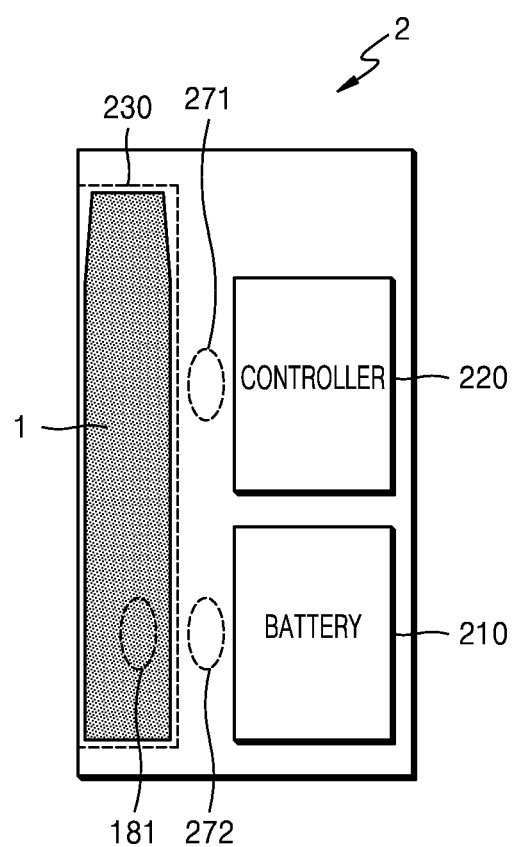
FIG. 5 is a diagram illustrating an example in which a holder is inserted into a cradle.

FIG. 5 is a diagram illustrating an example in which a holder is inserted into a cradle.

FIG. 5 illustrates an example in which the holder 1 is inserted into the cradle 2. Since the space 230 into which the holder 1 is to be inserted is present on one side of the cradle 2, the inserted holder 1 may not be exposed to the outside by other sides of the cradle 2. Accordingly, the cradle 2 may not include other components (e.g., a lid) designed not to expose the holder 1 to the outside.

The cradle 2 may include at least one binding member 271 or 272 to increase binding intensity with the holder 1. The holder 1 may include at least one binding member 181. Here, the binding members 181, 271, and 272 may include magnets. However, embodiments of the present disclosure are not limited thereto. FIG. 5 illustrates that the holder 1 includes one binding member 181, and the cradle 2 includes two binding members 271 and 272 for ease of description. However, the number of the bindings 181, 271 and 272 is not limited thereto.

The holder 1 may include the binding member 181 at a first position, and the cradle 2 may include the binding members 271 and 272 at a second position and a third position, respectively. In that case, the first position and the third position may face each other when the holder 1 is inserted into the cradle 2.

As the binding members 181, 271, and 272 are included in the holder 1 and the cradle 2, even when the holder 1 is inserted into one side of the cradle 2, the holder 1 and the cradle 2 may be bound to each other more strongly than before. In other words, as the holder 1 and the cradle 2 further include the binding members 181, 271, and 272 in addition to terminals, the holder 1 and the cradle 2 may be bound to each other more strongly than before. Therefore, even when the cradle 2 does not include any separate component (for example, a lid), the inserted holder 1 may not be easily separated from the cradle 2.

In addition, when it is determined that the holder 1 is completely inserted into the cradle 2 by the terminals and/or the binding members 181, 271, and 272, the controller 220 may use electric power of the battery 210 to charge the battery 110 of holder 1.

Figure 6:
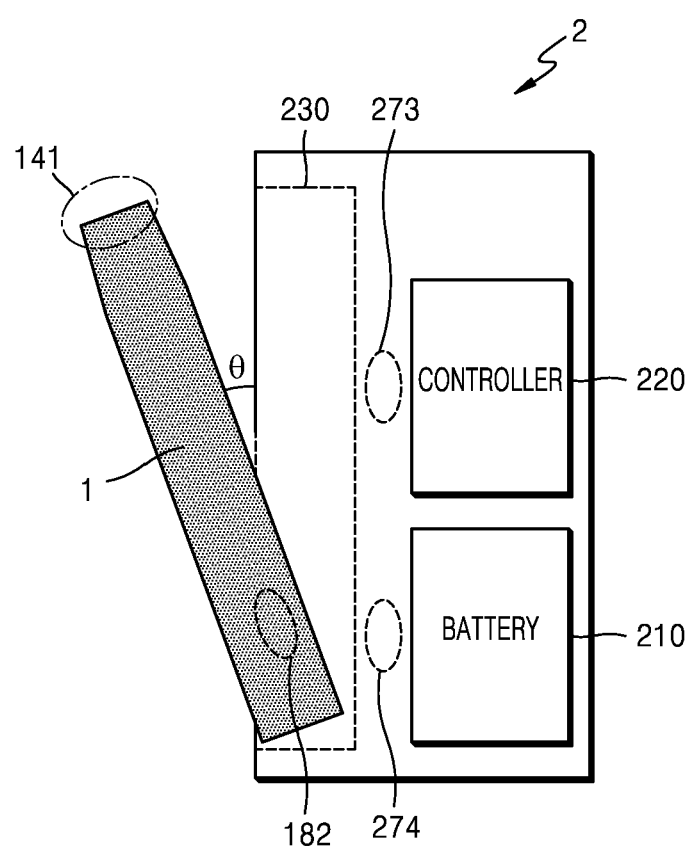
FIG. 6 is a diagram illustrating an example in which a holder is tilted while inserted into a cradle.

FIG. 6 is a diagram illustrating an example in which a holder is tilted while inserted into a cradle.

Referring to FIG. 6, the holder 1 is tilted in the cradle 2. Here, "tilt" refers to a state in which the holder 1 is inclined at a certain angle while inserted into the cradle 2.

As illustrated in FIG. 5, when the holder 1 is completely inserted into the cradle 2, a user is unable to smoke. In other words, when the holder 1 is completely inserted into the cradle 2, a cigarette is unable to be inserted into the holder 1. Therefore, the user is unable to smoke when the holder 1 is completely inserted into the cradle 2.

As illustrated in FIG. 6, when the holder 1 is tilted, the end 141 of the holder 1 is exposed to the outside. In that case, the user may insert the cigarette into the end 141 and inhale (smoke) generated aerosol. When the cigarette is inserted into the end 141 of the holder 1, a tilt angle θ may be adequately angled such that the cigarette is not bent or damaged. For example, the holder 1 may be tilted at a minimum angle or a larger angle at which an entire cigarette insertion hole included at the end 141 is exposed to the outside. For example, a range of the tilt angle θ may be 0° or more and 180° or less, and it is desirable that the range of the tilt angle θ be 5° or more and 90° or less. It is most desirable that the range of the tilt angle θ be 5° or more and 20° or less, 5° or more and 30° or less, 5° or more and 40° or less, 5° or more and 50° or less, or 5° or more and 60° or less. It is most desirable that the range of the tilt angle θ be 10°.

In addition, even if the holder 1 is tilted, a terminal of the holder 1 and a terminal of the cradle 2 are coupled to each other. Therefore, the heater 130 of the holder 1 may be heated by the electric power supplied by the battery 210 of the cradle 2. Accordingly, even when a remaining capacity of the battery 110 of the holder 1 is small or there is no capacity left, the holder 1 may use the battery 210 of the cradle 2 to generate the aerosol.

FIG. 6 illustrates an example in which the holder 1 includes one binding member 182 and the cradle 2 includes two binding members 273 and 274. For example, a position of each of the binding members 182, 273, and 274 is as described above with reference to FIG. 5. Provided that the binding members 182, 273, and 274 are magnets, magnet intensity of the binding member 274 may be greater than that of the binding member 273. Therefore, even if the holder 1 is tilted, the holder 1 may not be completely separated from the cradle 2 thanks to the binding member 182 and the binding member 274.

In addition, when it is determined that the holder 1 is tilted by terminals and/or the binding members 182, 273, and 274, the controller 220 may use the electric power of the battery 210 to heat the heater 130 of the holder 1, or charge the battery 110.

Figure 7:
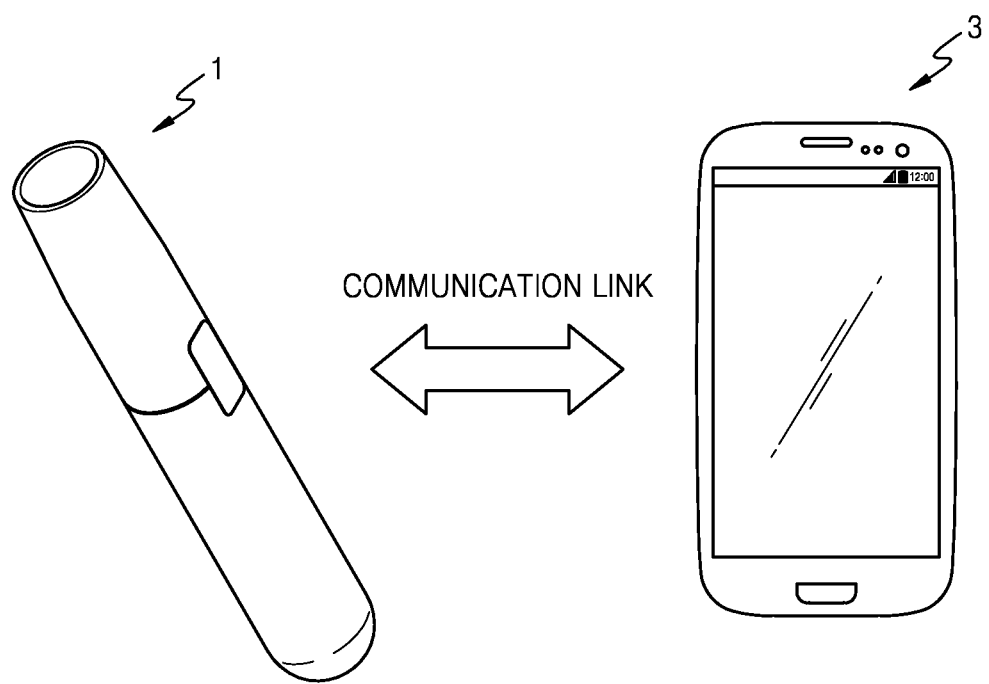
FIG. 7 is a schematic diagram of a system that transmits and receives data to and from an aerosol generating device, according to some embodiments.

FIG. 7 is a schematic diagram of a system that transmits and receives data to and from an aerosol generating device, according to some embodiments.

Referring to FIG. 7, the system may include the holder 1 and a mobile terminal 3. The mobile terminal 3 is an electronic terminal capable of transmitting and receiving data to and from other devices through wired or wireless communication, and may be portable. Examples of the mobile terminal 3 may include a smartphone, a tablet, personal digital assistants (PDA) and a portable multimedia player (PMP). The mobile terminal 3 is represented in a shape of a smartphone in FIG. 7, but that is merely an example and is not intended to limit the mobile terminal 3.

The mobile terminal 3 may transmit and receive data to and from the holder 1 through a communication link. In addition, the mobile terminal 3 may use data received from the holder 1 to perform an operation related to the holder 1 or output information on the holder 1. Since a user usually carries the mobile terminal 3 with himself or herself, the user may be provided with additional functionality associated with the holder 1, without any restrictions in terms of place due to the mobile terminal 3.

In addition, the user may be provided with various functions such as a function of preventing loss of the holder 1, a function of providing smoking statistics information including places in which the user has smoked, and the like, based on the specificity of the mobile terminal 3. Hereinafter, the various functions provided to the user by the mobile terminal 3 will be described in greater detail with reference to FIG. 8.

Figure 8:
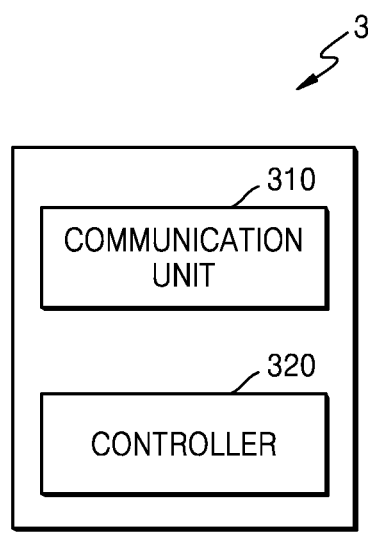
FIG. 8 is a block diagram illustrating a configuration of a mobile terminal, according to some embodiments.

FIG. 8 is a block diagram illustrating a configuration of a mobile terminal, according to some embodiments.

Referring to FIG. 8, the mobile terminal 3 may include a communication unit 310 and a controller 320. The mobile terminal 3 illustrated in FIG. 8 illustrates only components related to the present embodiment. Therefore, those skilled in the art related to the present embodiment may understand that other general-purpose components in addition to the components illustrated in FIG. 8 may be further included in the mobile terminal 3. For example, the mobile terminal 3 may further include at least one of a memory (not shown), a user input unit (not shown), and a display (not shown).

The memory is hardware configured to store various types of data processed within the mobile terminal 3. The memory may store applications, drivers, and the like to be driven by the mobile terminal 3. The memory may store at least one program executable by the mobile terminal 3. The memory may include at least one type of storage medium of a flash memory type, a hard disk type, a multimedia card micro type, a card type memory (for example, secure digital (SD) memory, extreme digital (XD) memory, or the like), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disk.

The user input unit refers to a means for a user to input data for controlling the mobile terminal 3. For example, the user input unit may include a key pad, a touch pad (a contact capacitance method, a pressure resistance film method, an infrared detection method, a surface ultrasonic conduction method, an integral tension measurement method, a piezo effect method, etc.), a jog wheel, a jog switch, a fingerprint recognition device, an iris recognition device, etc. However, embodiments of the present disclosure not limited thereto.

The display displays and outputs information processed by the mobile terminal 3. For example, the display may display information on the holder 1, and may display a graphic user interface for receiving a user input. The mobile terminal 3 may also include various devices (e.g., a speaker) for outputting information to the user apart from the display.

The communication unit 310 may include at least one communication interface for transmitting and receiving data to and from other devices. For example, the communication unit 310 may include one or more components for communicating with the holder 1. The communication unit 310 may form a communication link with the holder 1. The communication link may be formed by a short-range communication method including at least one of wireless fidelity (Wi-Fi), Bluetooth, Zigbee, Wi-Fi Direct (WFD), ultra wideband (UWB), Bluetooth Low Energy (BLE), and near-field communication (NFC). However, embodiments of the present disclosure are not limited thereto, and the communication link may be formed by a wired communication method such as a USB communication cable.

The controller 320 may be implemented by one or a plurality of processors. For example, the controller 320 may be implemented as an array of a plurality of logic gates, or may be implemented as a combination of a general-purpose microprocessor and a memory in which a program executable in the microprocessor is stored.

The controller 320 may use data received from the holder 1 to perform an operation related to the holder 1 or output information on the holder 1. For example, the controller 320 may provide the user with various functions, such as a function of preventing loss of the holder 1, a function of providing smoking statistics information including places in which the user has smoked, and the like. The controller 320 may use any suitable output device including the display, the speaker, and the like to output information on the holder 1.

The controller 320 may obtain a unique ID of the holder 1 from the holder 1 through the communication link, determine whether or not the obtained unique ID and user authentication information correspond to each other, and transmit the determined result to the holder 1. For example, the controller 320 may determine that the obtained unique ID and the user authentication information correspond to each other and transmit the result to the holder 1. The holder 1 may be set to be controllable by the user only when receiving a determined result saying that the unique ID of the holder 1 and the user authentication information correspond to each other. Accordingly, it is possible to prevent an unauthorized user or a minor from controlling the holder 1.

The unique ID of the holder 1 may refer to a product number assigned to the holder 1. However, embodiments of the present disclosure are not limited thereto, and the unique ID of the holder 1 may be any identification information uniquely assigned to the holder 1 to distinguish the holder 1 from other aerosol generating devices. The user authentication information may include at least one of a user ID, a password, and biometric identification information input by the user input unit. The biometric identification information may include at least one of the user's fingerprint identification information and iris identification information.

The unique ID of the holder 1 and the user authentication information may be matched in advance and stored. For example, the controller 320 may store information obtained by matching the unique ID of the holder 1 with the user authentication information in a memory. However, embodiments of the present disclosure are not limited thereto, and alternatively the controller 320 may store information obtained by matching the unique ID of the holder 1 with the user authentication information in an external device or server of the mobile terminal 3. The controller 320 may use the matched information pre-stored in the memory, the external device, or the server of the mobile terminal 3 to determine whether or not the user information input by the user input unit and the unique ID obtained from the holder 1 correspond to each other.

The controller 320 may obtain information on a puff of the user from the holder 1 and generate smoking statistics information of the user, based on the obtained information on the puff of the user. The information on the puff of the user may include information on at least one of whether or not puffing has started, whether or not puffing has ended, the number of puffs, and a period of time during which puffing has lasted. Those skilled in the art may easily understand that the holder 1 may use various methods to obtain information on at least one of whether or not puffing has started, whether or not puffing has ended, the number of puffs, and a period of time during which puffing has lasted.

The smoking statistics information may include information on at least one of an average number of puffs, an average period of time during which puffing lasts, places in which the user has smoked, the number of cigarettes consumed during a specific period of time, and a type of cigarette consumed. Information on the average number of puffs and on the average period of time during which puffing lasts may be generated based on the information on the number of puffs and the period of time during which puffing has lasted obtained from the holder 1. In addition, the information on the places in which the user has smoked may be generated based on information on a location of the mobile terminal 3 at the time when the controller 320 obtained, from the holder 1, the information on whether or not puffing has started or on whether or not puffing has ended. The information on the location of the mobile terminal 3 may be obtained by a global positioning system (GPS) device (not shown) included in the mobile terminal 3.

In addition, the information on the number of cigarettes consumed during a specific period of time may be generated based on the information on whether or not puffing has started and on whether or not puffing has ended, obtained from the holder 1, and the information on the type of cigarette consumed may be generated based on cigarette identification information obtained from the holder 1. Those skilled in the art may easily understand that the holder 1 may use a variety of methods to identify the type of the cigarettes. The controller 320 may display the generated smoking statistics information of the user on a screen through the display.

According to some embodiments, the controller 320 may detect whether or not the mobile terminal 3 is separated from the holder 1 by a preset distance or more, and may output an alarm, based on the detected result. For example, as the controller 320 determines that the mobile terminal 3 is separated from the holder 1 by the preset distance or more, the controller 320 may output an alarm. The alarm may be displayed on the screen through the display, or may be output through a speaker. As the controller 320 outputs the alarm, the user carrying the mobile terminal 3 with himself or herself may check whether or not the holder 1 is separated from the mobile terminal 3 by the preset distance or more, and loss of the holder 1 may be prevented, accordingly.

As the mobile terminal 3 is spaced apart from the holder 1 and the communication link is disconnected, the controller 320 may determine that the mobile terminal 3 is separated from the holder 1 by the preset distance or more. In that case, the preset distance may correspond to a distance that the communication link is able to maintain. However, embodiments of the present disclosure are not limited thereto, and the controller 320 may use any suitable method to determine that the mobile terminal 3 is separated from the holder 1 by the preset distance or more. The preset distance may be set by the user.

According to another embodiment, the controller 320 may detect whether or not the mobile terminal 3 is located within the preset distance from the holder 1, and may output an alarm, based on the detected result. In addition, as the distance between the mobile terminal 3 and the holder 1 decreases, the controller 320 may increase intensity of the alarm. Thus, the user may easily identify a location of the holder 1 in a situation where it is difficult to secure a view, such as a situation where a light in a room in which the user is located is turned off.

The controller 320 may obtain information on a battery from the holder 1 and display at least one of an available time of the holder 1 and a remaining capacity of the battery on the screen, based on the obtained information on the battery. The available time of the holder 1 may be determined based on the remaining capacity of the battery of the holder 1, or may be determined based on the number of the consumed cigarettes. The available time of the holder 1 may be represented as the number of cigarettes that may be consumed, or a remaining time. However, embodiments of the present disclosure are not limited thereto.

Figure 9:
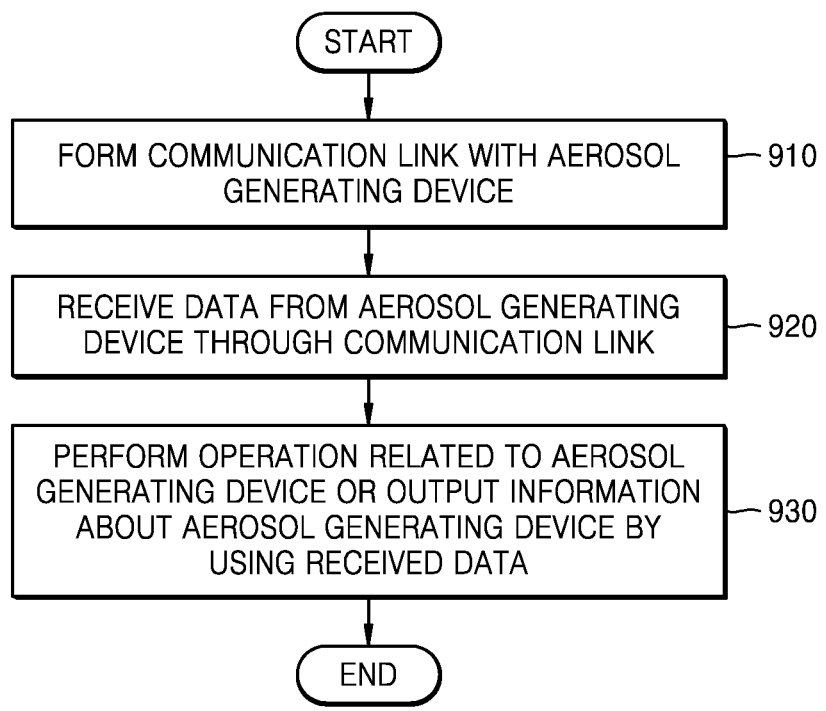
FIG. 9 is a flowchart of a method, performed by a mobile terminal, of transmitting and receiving data to and from an aerosol generating device, according to some embodiments.

FIG. 9 is a flowchart of a method, performed by a mobile terminal, of transmitting and receiving data to and from an aerosol generating device, according to some embodiments.

Referring to FIG. 9, the method of transmitting and receiving data to and from the aerosol generating device includes operations that are time-sequentially processed by the mobile terminal 3 illustrated in FIGS. 7 and 8. Therefore, although omitted hereinafter, descriptions given above with respect to the mobile terminal 3 of FIGS. 7 and 8 also apply to the method of transmitting and receiving data to and from the aerosol generating device of FIG. 9.

The mobile terminal 3 may form a communication link with the holder 1, in operation 910. The communication link may be formed by a short-range communication method including at least one of Wi-Fi, Bluetooth, Zigbee, WFD, UWB, BLE, and NFC. However, embodiments of the present disclosure are not limited thereto, and the communication link may also be formed by a wired communication method such as a USB communication cable.

The mobile terminal 3 may receive data from the holder 1 through the communication link, in operation 920. For example, the mobile terminal 3 may receive, from the holder 1, a unique ID of the holder 1, information on a location of the holder 1, information on a user's puff, information on a battery, and the like. However, embodiments of the present disclosure are not limited thereto.

The mobile terminal 3 may use the received data to perform an operation related to the holder 1 or output information on the holder 1. Thus, the user may be provided with a variety of functions such as a function of preventing loss of the holder 1, a function of providing smoking statistics information including places in which the user has smoked, and the like, based on the specificity of the mobile terminal 3 (for example, the user usually carries the mobile terminal 3 with himself or herself).

The method of transmitting and receiving data to and from the aerosol generating device of FIG. 9 may be recorded on a computer-readable recording medium having recorded thereon one or more programs including instructions for executing the method. Examples of the computer-readable recording media include magnetic media such as hard disks, floppy disks and magnetic tapes, optical media such as CD-ROMs and DVDs, and magneto-optical media such as floptical disks, and a hardware device specially configured to store and execute program instructions such as ROM, RAM, flash memory, and the like. Examples of the program instructions include not only machine language codes such as those produced by a compiler, but also high-level language codes that may be executed by a computer using an interpreter or the like.

Those of ordinary skill in the art related to the present disclosure may understand that various changes in form and details may be made therein without departing from the scope of the characteristics described above. The disclosed methods should be considered in a descriptive sense only and not for purposes of limitation. The scope of the present disclosure is defined by the appended claims rather than by the foregoing descriptions, and all differences within the scope of equivalents thereof should be construed as being included in the present disclosure.

The invention claimed is:

1. A mobile terminal that transmits and receives data to and from an aerosol generating device, the mobile terminal comprising:
  a communication interface configured to form a communication link with the aerosol generating device; and
  a hardware processor configured to receive data from the aerosol generating device through the communication link, and perform an operation related to the aerosol generating device or output information about the aerosol generating device, by using the received data,
  wherein the hardware processor is further configured to:
    obtain information on a puff of the user from the aerosol generating device; and
    generate smoking statistics information of the user, based on the obtained information on the puff of the user, and
  wherein the smoking statistics information comprises information on at least one of an average number of puffs, an average period of time during which puffing lasts, and the number of cigarettes consumed for a specific period of time,
  wherein the hardware processor is further configured to obtain a unique identification (ID) of the aerosol generating device from the aerosol generating device through the communication link, determine whether the obtained ID and user authentication information correspond to each other, and transmit the determined result to the aerosol generating device, and
  wherein the aerosol generating device is set to be controllable by the user only when the determined result indicates that the obtained ID and user authentication information correspond to each other.

2. The mobile terminal of claim 1, wherein the mobile terminal further comprises a user input unit, and the user authentication information comprises at least one of the user's fingerprint identification information and iris identification information input by the user input unit.

3. The mobile terminal of claim 1, wherein the information on the puff of the user comprises information on at least one of whether puffing has started, whether puffing has ended, the number of puffs, and a period of time during which puffing has lasted.

4. The mobile terminal of claim 1, wherein the hardware processor is further configured to obtain information about a battery from the aerosol generating device, and display at least one of an available time of the aerosol generating device and a remaining capacity of the battery on a screen, based on the obtained information about the battery.

5. The mobile terminal of claim 1, wherein the communication link is formed by a short-range communication method including at least one of wireless fidelity (Wi-Fi), Bluetooth, Zigbee, Wi-Fi Direct (WFD), ultra wideband (UWB), Bluetooth Low Energy (BLE), and near-field communication (NFC).

6. A method, performed by a mobile terminal, of transmitting and receiving data to and from an aerosol generating device, the method comprising:
  forming a communication link with the aerosol generating device;
  receiving data from the aerosol generating device through the communication link; and
  performing an operation related to the aerosol generating device or outputting information about the aerosol generating device, by using the received data,
  wherein the method further comprises:
    obtaining information on a puff of the user from the aerosol generating device; and
    generating smoking statistics information of the user, based on the obtained information on the puff of the user, and
  wherein the smoking statistics information comprises information on at least one of an average number of puffs, an average period of time during which puffing lasts, and the number of cigarettes consumed for a specific period of time,
  wherein method further comprises obtaining a unique identification (ID) of the aerosol generating device from the aerosol generating device through the communication link, determine whether the obtained ID and user authentication information correspond to each other, and transmit the determined result to the aerosol generating device, and
  wherein the aerosol generating device is set to be controllable by the user only when the determined result indicates that the obtained ID and user authentication information correspond to each other.

7. A non-transitory computer-readable recording medium having recorded thereon one or more programs including instructions for executing a method of transmitting and receiving data to and from an aerosol generating device, the method comprising:
  forming a communication link with the aerosol generating device;
  receiving data from the aerosol generating device through the communication link; and
  performing an operation related to the aerosol generating device or outputting information about the aerosol generating device, by using the received data, wherein the method further comprises:
  obtaining information on a puff of the user from the aerosol generating device; and
  generating smoking statistics information of the user, based on the obtained information on the puff of the user, and
wherein the smoking statistics information comprises information on at least one of an average number of puffs, an average period of time during which puffing lasts, and the number of cigarettes consumed for a specific period of time,
wherein method further comprises obtaining a unique identification (ID) of the aerosol generating device from the aerosol generating device through the communication link, determine whether the obtained ID and user authentication information correspond to each other, and transmit the determined result to the aerosol generating device, and
wherein the aerosol generating device is set to be controllable by the user only when the determined result indicates that the obtained ID and user authentication information correspond to each other.

* * * * *